(12) United States Patent
Rosenberg et al.

(10) Patent No.: US 6,947,162 B2
(45) Date of Patent: Sep. 20, 2005

(54) SYSTEMS AND METHODS FOR CONVERTING THE FORMAT OF INFORMATION

(75) Inventors: Steven Rosenberg, Palo Alto, CA (US); Carl Staelin, Halfa (IL); Kristin Smith, Meridian, ID (US); Doug Kaltenecker, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 737 days.

(21) Appl. No.: 09/943,620

(22) Filed: Aug. 30, 2001

(65) Prior Publication Data

US 2004/0205616 A1 Oct. 14, 2004

(51) Int. Cl.$^7$ ............................................. G06K 15/00
(52) U.S. Cl. ..................................................... 358/1.15
(58) Field of Search ............................ 707/103 Y, 103, 707/103 Z, 104.1; 717/116; 382/100, 217; 358/403, 406, 462, 471; 715/515, 516, 517; 379/88.14

(56) References Cited

U.S. PATENT DOCUMENTS

| | | | | |
|---|---|---|---|---|
| 6,073,161 A | * | 6/2000 | DeBoskey et al. | 709/200 |
| 6,647,125 B2 | * | 11/2003 | Matsumoto et al. | 382/100 |
| 2002/0116416 A1 | * | 8/2002 | Tesch et al. | 707/516 |

* cited by examiner

*Primary Examiner*—Jerome Grant, II

(57) ABSTRACT

Format processing systems for converting the format of a document are disclosed. In this regard, a representative document processing system includes a file conversion system configured to receive information corresponding to a first document as well as receive information corresponding to a second format to which the information corresponding to the first document is to be converted. Additionally, the file conversion system is configured to retrieve information corresponding to a set of format rules, the set of format rules corresponding to the second format. The file conversion system converts the information corresponding to the first document to image data having at least one object group. Thereafter, the file conversion system converts the image data to converted data representative of the first document and exhibiting the second format. Methods and other systems also are provided.

31 Claims, 10 Drawing Sheets

SYSTEMS AND METHODS FOR CONVERTING THE FORMAT OF INFORMATION

BACKGROUND OF THE INVENTION

1. Technical Field

The present invention is generally related to file format conversion and, more particularly, is related to methods and systems for converting data from one file format to another file format.

2. Description of the Related Art

A file format is the internal structure of a file that defines the way in which the file is stored. Application program modules typically create files that have unique native file format. A file format may include various types of control instructions and codes used by application program modules and hardware devices. The native file format of one application program is generally distinct from and incompatible with the native file formats of other application programs.

An end-user's desire for application program compatibility has given rise to the practice of file format conversion. Most modern application program modules are equipped with program modules, functions, or routines, generally known as "converters." Converters enable an application program module to convert a file from a foreign format into a native file format. Converters are well known in the art for almost any type of application program module, including word processing programs, spreadsheet programs, graphic editing programs, desktop publishing programs, etc.

Converters may be configured to convert a variety of foreign file formats to a native file format. Converters thus provide an application program module with the ability to open files created by many different application program modules, including different versions of those applications. A converter will generally include a function or routine, referred to herein as a "recognition" function, that examines a foreign file to determine whether the converter is able to fully convert the foreign file format to a native file format, i.e. convert the foreign file without losing much, if any, of the style and presentation of its content.

When a recognition function does not recognize a foreign file format as one that can be fully converted, either a text-only conversion is performed or the user is prompted to manually identify the file format or terminate the conversion. Text-only conversion is often undesirable because it is not a full conversion. In a text-only conversion, almost all of the style and presentation of the content of the foreign file is usually lost.

In regard to previous converters, a native document must have a native file format in order for the native application program to convert the native document into a foreign file format. For example, scanned documents are typically stored as a native scanner file format, which can be converted to file formats that are supported by the scanner application. Often the scanner application program only supports conversion into select file formats. To further complicate matters, the scanned document may only be able to be converted using the scanner application program, which can cause problems if the scanned document is distributed to persons not having the scanner application program. In other instances, it may be difficult to convert the native/foreign file format because of their inherent design. For example, documents stored having PDF formats cannot easily and accurately be converted to other documents having foreign file formats.

Thus, a heretofore unaddressed need exists in the industry to address the aforementioned and/or other deficiencies and inadequacies associated with currently used file conversion technology.

SUMMARY OF THE INVENTION

Briefly described, the invention provides systems for converting the format of a document, the document being configured in a first format. In this regard, the document processing system includes a file conversion system configured to receive information corresponding to the first document. In addition, the file conversion system is configured to receive information corresponding to a second format to which the information corresponding to the first document is to be converted. Further, the file conversion system is configured to retrieve information corresponding to a set of format rules, the set of format rules corresponding to the second format. Furthermore, the file conversion system is configured to convert the information corresponding to the first document to image data having at least one object group. Still furthermore, the file conversion system is configured to convert the image data to converted data representative of the first document and exhibiting the second format.

The present invention also involves computer systems for converting formats converting file formats. In this regard, a representative method includes: receiving information corresponding to a first document; receiving information corresponding to a second format to which the information corresponding to the first document is to be converted; retrieving information corresponding to a set of format rules, the set of format rules corresponding to the second format; converting the information corresponding to the first document to image data having at least one object group; and converting the image data to converted data representative of the first document and exhibiting the second format.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Methods and systems of the present invention overcome at least some of the problems associated with known file conversion techniques by facilitating easy and efficient conversion of various file formats into other file formats. In this regard, the methods and systems of the present invention are adapted to receive information corresponding to documents. Such information can exhibit various file formats. The information subsequently converted to converted data representative of the first document. As will be discussed in greater detail herein, the converted data can exhibit any one of a number of formats. In some embodiments, this is accomplished by producing image data from the received information and then converting the image data to converted data exhibiting one of a variety of file formats.

Figure 1A:
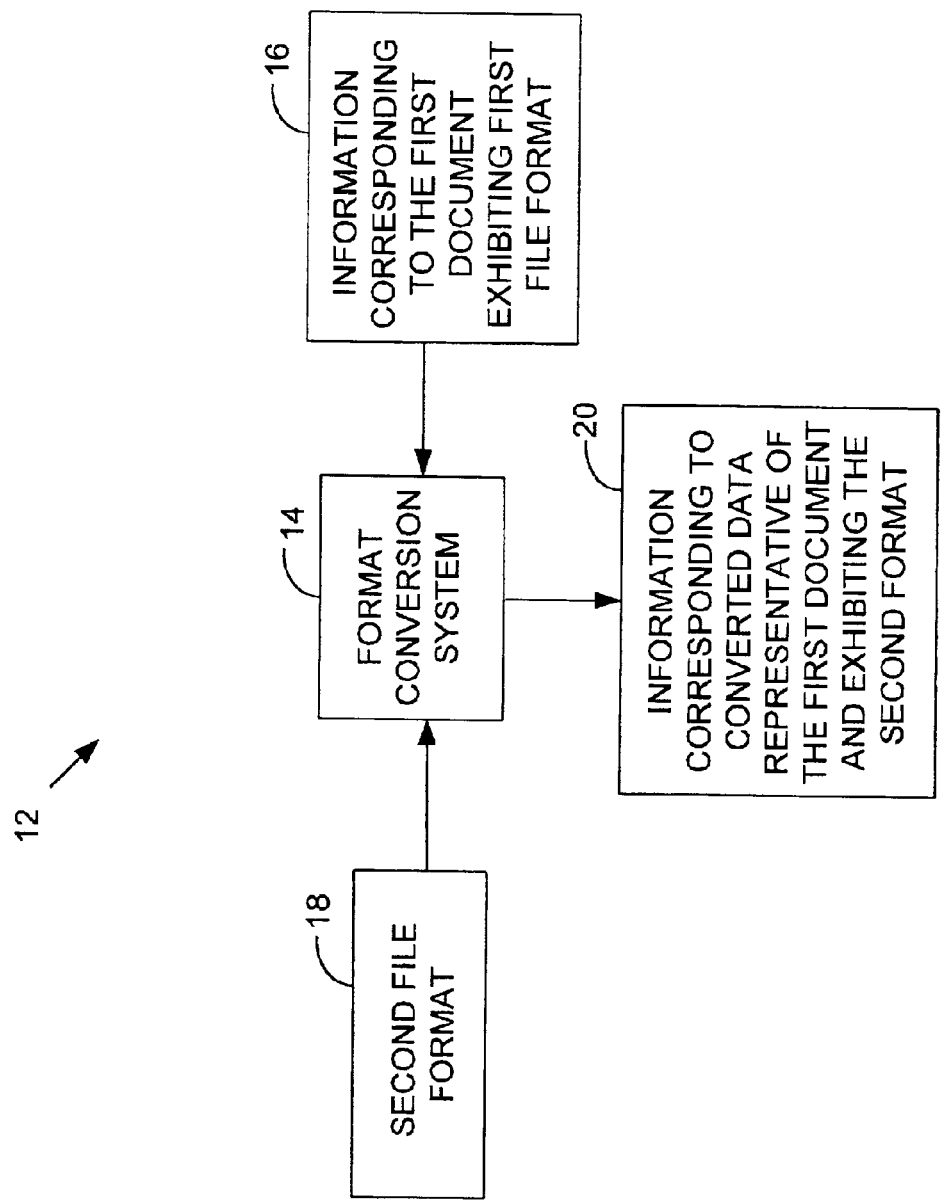
FIG. 1A is a schematic diagram illustrating a representative embodiment of the document processing system of the present invention.

Turning now to the drawings, wherein like reference numerals designate corresponding parts throughout the views, FIG. 1A illustrates a representative embodiment of a format processing system 12. As shown in FIG. 1A, the format processing system 12 includes a format conversion system 14. The format conversion system 14 is adapted to receive information corresponding to a first document 16 with one of a number of formats (a first format). The format conversion system 14 is also adapted to receive information corresponding to a second format to which to convert the information corresponding to the first document 16. The second format is different than the first format. As will be described in more detail later, the format conversion system 14 facilitates the conversion of the information corresponding to first document 16 into converted data representative of the first document and exhibiting the second format 20.

Figure 1B:
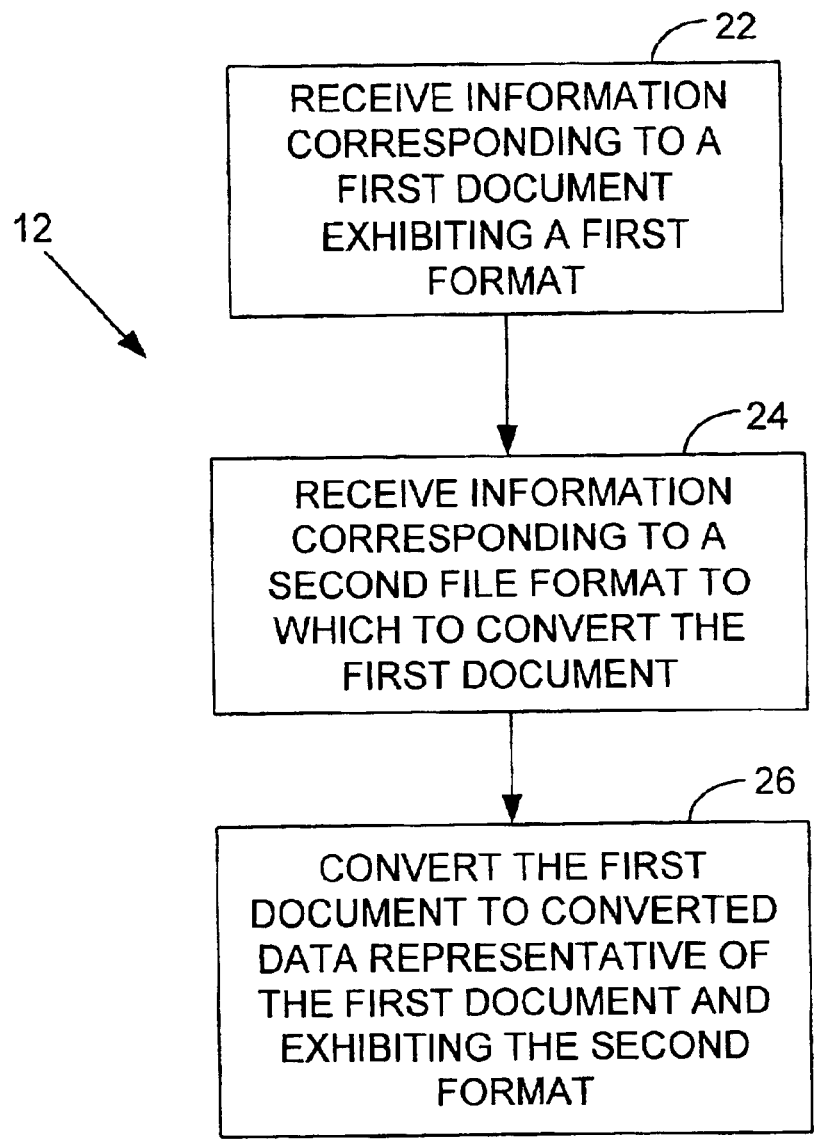
FIG. 1B is a flow diagram illustrating representative functionality of the document processing system referred to in FIG. 1A.

Reference will now be made to the flow diagram illustrated in FIG. 1B, which depicts the functionality of a representative embodiment of the format processing system 12. Each block of the following flow diagrams (e.g. FIG. 1B-9) represents a module segment, portion of code or logic circuit(s) for implementing the specified logical function(s). It should also be noted that in some alternative implementations the functions noted in various blocks of FIG. 1B, or any other of the accompanying flow diagrams, may occur out of the order in which they are depicted. For example, two blocks shown in succession in FIG. 1B may, in fact, be executed substantially concurrently. In other embodiments, the blocks may sometimes be executed in a different or reverse order depending upon the functionality involved.

The format processing system (or method) 12 begins at block 22 where information corresponding to the first document 16 exhibiting a first format is received. In block 24, information corresponding to a second format to which to convert the information corresponding to first document is received. In block 25, the information corresponding to first document 16 is converted to converted data representative of the first document and exhibiting the second format 20. Preferably, the functionality generally described in relation to block 22–26 is implemented by a file conversion system, such as file conversion system 14 of FIG. 1A.

Figure 2:
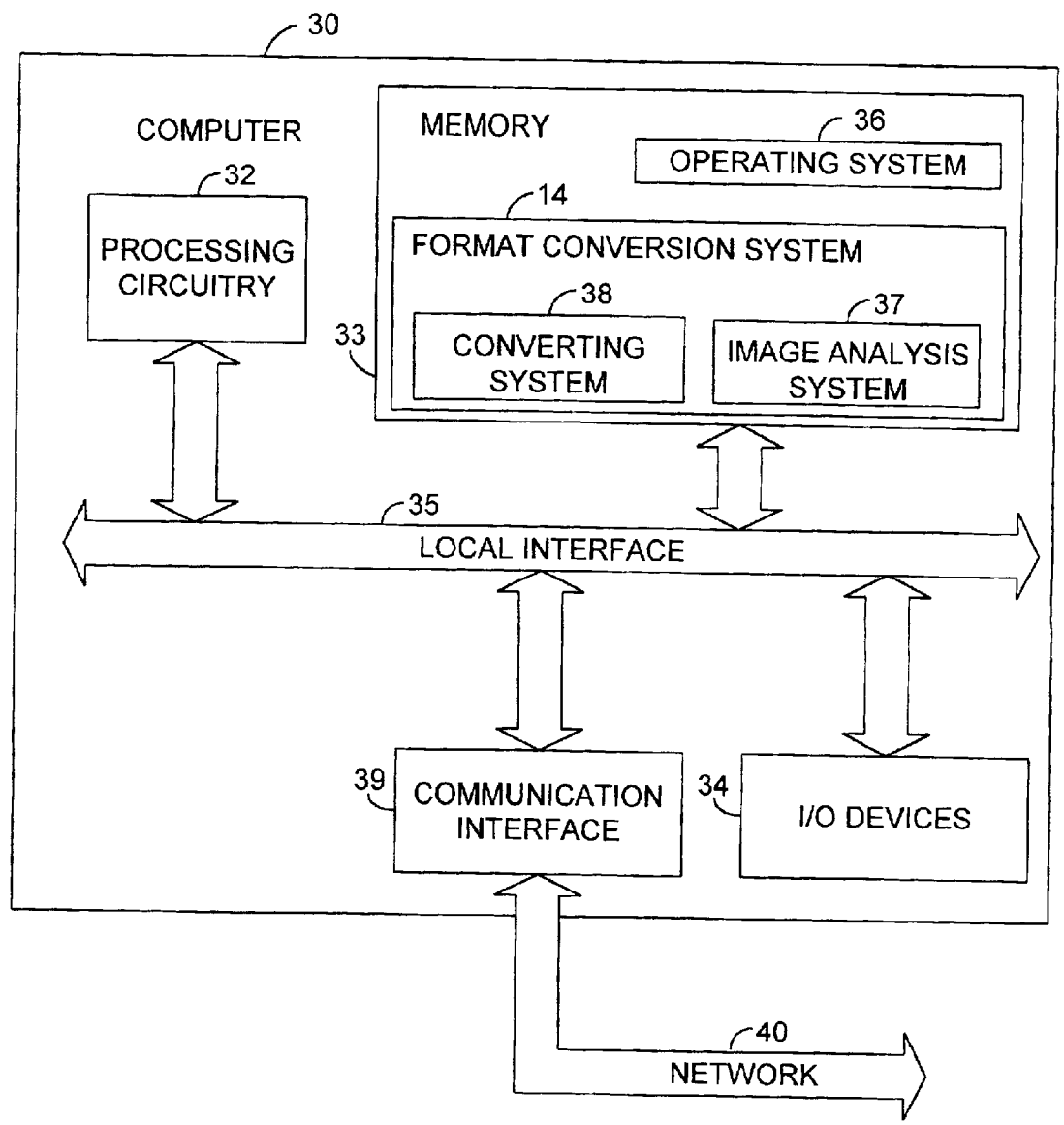
FIG. 2 is a schematic diagram of a representative computer or processor-based system that can be used to implement the file conversion system of FIGS. 1A and 1B.

File conversion systems 14 of the present invention can be implemented in software, firmware, hardware, or a combination thereof. Preferably, the format conversion system 14 is implemented in software as an executable program that can be executed by a special or general purpose digital computer, such as a personal computer, workstation, minicomputer, or mainframe computer. An example of a representative computer or processor-based system that can implement the format conversion system 14 is shown in FIG. 2.

Generally, in terms of hardware architecture, computer 30 includes a processor 32, memory 33, and one or more input and/or output (I/O) devices 34 (or peripherals) that are communicatively coupled via a local interface 35. The local interface 35 can be, for example but not limited to, one or more buses or other wired or wireless connections, as is known in the art. The local interface 35 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer 30 can be communicatively coupled to other computers, servers, etc. via a network 40. Network 40 can be one or more networks capable of enabling the above components to communicate and include, for example, a local area network (LAN), a wireless local area network (WLAN), a metropolitan area network (MAN), a wide area network (WAN), any public or private packet-switched or other data network, including the Internet, circuit-switched networks, such as the public switched telephone network (PSTN), wireless networks, or any other desired communications infrastructure.

The processor 32 can be a hardware device for executing software, particularly that stored in memory 33. The processor 32 can be any custom made or commercially available processor, a central processing unit (CPU), an auxiliary processor among several processors associated with the computer 30, a semiconductor based microprocessor (in the form of a microchip or chip set), a macroprocessor, or generally any device for executing software instructions.

The memory 33 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 33 may incorporate electronic, magnetic, optical, and/or other types of storage media. Note that the memory 33 can have a distributed architecture, where various components are situated remote from one another, but can be accessed by the processor 32.

The software in memory 33 may include one or more separate programs, each of which comprises an ordered listing of executable instructions for implementing logical functions. In the example of FIG. 2, the software in the memory 33 includes the format conversion system 14 and a suitable operating system (O/S) 36. The operating system 36 essentially controls the execution of other computer programs, such as the format conversion system 14, and provides scheduling, input-output control, file and data management, memory management, and communication control and related services.

The format conversion system 14 can be a source program, executable program (object code), script, or any other entity comprising a set of instructions to be performed. When a source program, then the program needs to be translated via a compiler, assembler, interpreter, or the like, which may or may not be included within the memory 33, so as to operate properly in connection with the O/S 36. Furthermore, the format conversion system 14 can be written as (a) an object oriented programming language, which has classes of data and methods, or (b) a procedure programming language, which has routines, subroutines, and/or functions, for example, but not limited to, C, C++, Pascal, Basic, Fortran, Cobol, Perl, Java, and Ada.

The I/O devices 34 may include input devices, for example but not limited to, a keyboard, mouse, etc. Furthermore, the I/O devices 34 may also include output devices, for example but not limited to, a printer, display, mouse, keyboard, etc. Finally, the I/O devices 34 may further include devices that communicate both inputs and outputs, for instance but not limited to, a modulator/demodulator (modem; for accessing another device, system, or network), a radio frequency (RF) or other transceiver, a telephonic interface, etc.

If the computer is a PC, workstation, or the like, the software in the memory 33 may further include a basic input output system (BIOS) (omitted for simplicity). The BIOS is a set of essential software routines that initialize and test hardware at startup, start the O/S 36, and support the transfer of data among the hardware devices. The BIOS is stored in ROM so that the BIOS can be executed when the computer is activated.

When the computer 30 is in operation, the processor 32 is configured to execute software stored within the memory 33, to communicate data to and from the memory 33, and to generally control operations of the computer 30 pursuant to the software. The format conversion system 14 and the O/S 36, in whole or in part, but typically the latter, are read by the processor 32, perhaps buffered within the processor 32, and then executed.

When the format conversion system 14 is implemented in software, as is shown in FIG. 2, it should be noted that the format conversion system 14 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The format conversion system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the format conversion system 14 is implemented in hardware, the format conversion system 14 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

As depicted in FIG. 2, a representative embodiment of a format conversion system 14 includes a converting system 38 and an image analysis system 37. In some embodiments, the converting system 38 and image analysis process 37 are stored in the memory 33 of the computer 30. In other embodiments, however, the format conversion system 14 may only include the converting system 38. In the latter embodiment, the image analysis system 37 may not be necessary or may be located on a different computer or processor-based system.

Figure 3:
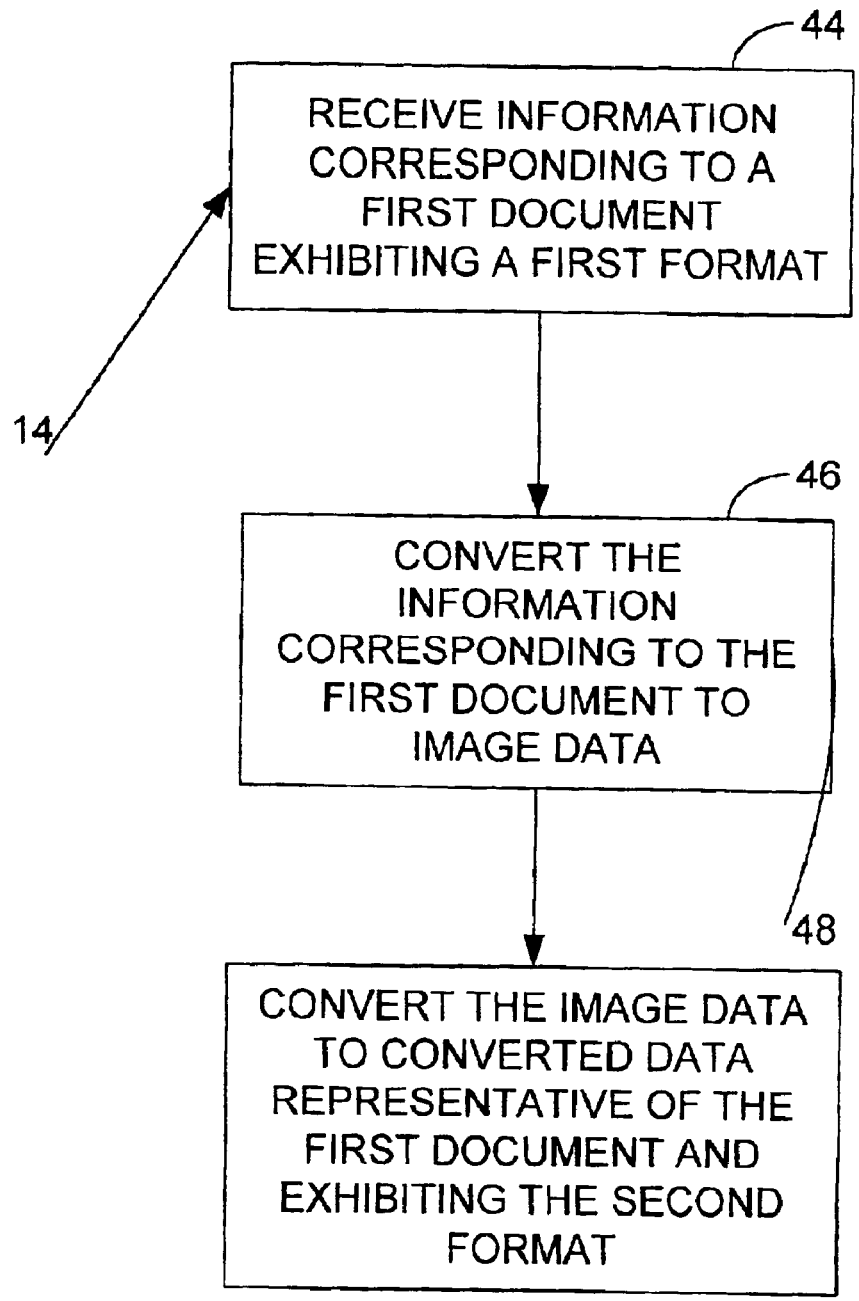
FIG. 3 is a flow diagram illustrating representative functionality of an embodiment of the document processing system referred to in FIGS. 1A and 1B.

FIG. 3 is a flow diagram that illustrates a representative embodiment of the format conversion system 14, where the format conversion system 14 does not include the analysis system 37. The format conversion system 14 is an exemplary system for performing the functions described in FIG. 3 and as such is adapted to receive information corresponding to a first document exhibiting a first format, as shown in block 44. The formats that the first format can exhibit include, for example, FPX, GIF, JPEG, TIFF, TIFF (compressed), TIFF (multipage), BMP, PCX, PNG, HTML, laserjet 1100 self viewer*.exe, PDF, RTF, TXT, WMF, etc. The format conversion system 14 is capable of converting the information corresponding to the first document to image data, as shown in block 46. The conversion can be accomplished with a conversion library. Conversion libraries are capable of producing object groups. The object groups are associated with information corresponding to the features of the first document. Object groups can include, for example, text, line art, images, photographs, tables, etc. The object groups can also include information concerning the coordinate location of the object groups. Now referring to block 48, the format conversion system 14 is adapted to convert the image data to converted data representative of the first document and exhibiting the second format. The second format includes formats such as, for example, FPX, GIF, JPEG, TIFF, TIFF (compressed), TIFF (multipage), BMP, PCX, PNG, HTML, laserjet 1100 self viewer*.exe, PDF, RTF, TXT, WMF, etc.

Figure 4:
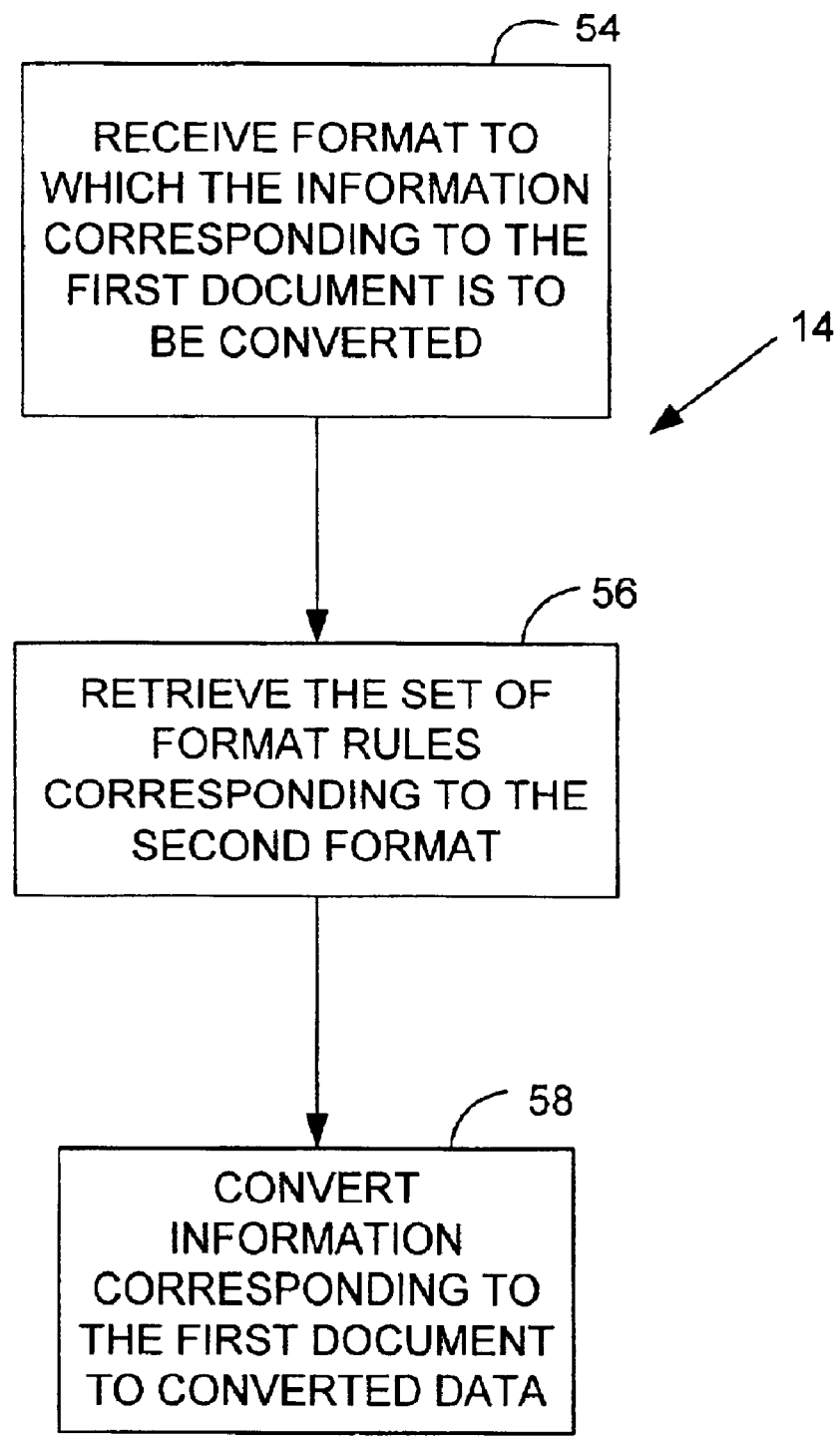
FIG. 4 is a flow diagram illustrating representative functionality of an embodiment of the file conversion system referred to in FIG. 2.

FIG. 4 is a flow diagram that further illustrates the representative embodiment of the file conversion system 38 depicted in FIG. 3. The format conversion system 14 is capable of receiving information corresponding to the second format to which to the information corresponding to the first document is to be converted, as shown in block 54.

Preferably, the format conversion system 14 also includes and/or has access to one or more sets of format rules, each of which corresponds to a particular format. Each second format has a corresponding set of format rules from which the format conversion system 14 can select and use to convert the information corresponding to the first document to converted data exhibiting the second format. The set of format rules facilitates the conversion from the first format to the second format. Upon receiving information corresponding to the second format, the format conversion system 14 is capable of retrieving, such as from memory 33, the set of format rules that corresponds to the second format, as shown in block 56. Thereafter, the format conversion system 14 is capable of converting the information corresponding to the first document to converted data representative of the first document and exhibiting the second format, as shown in block 58.

Figure 5:
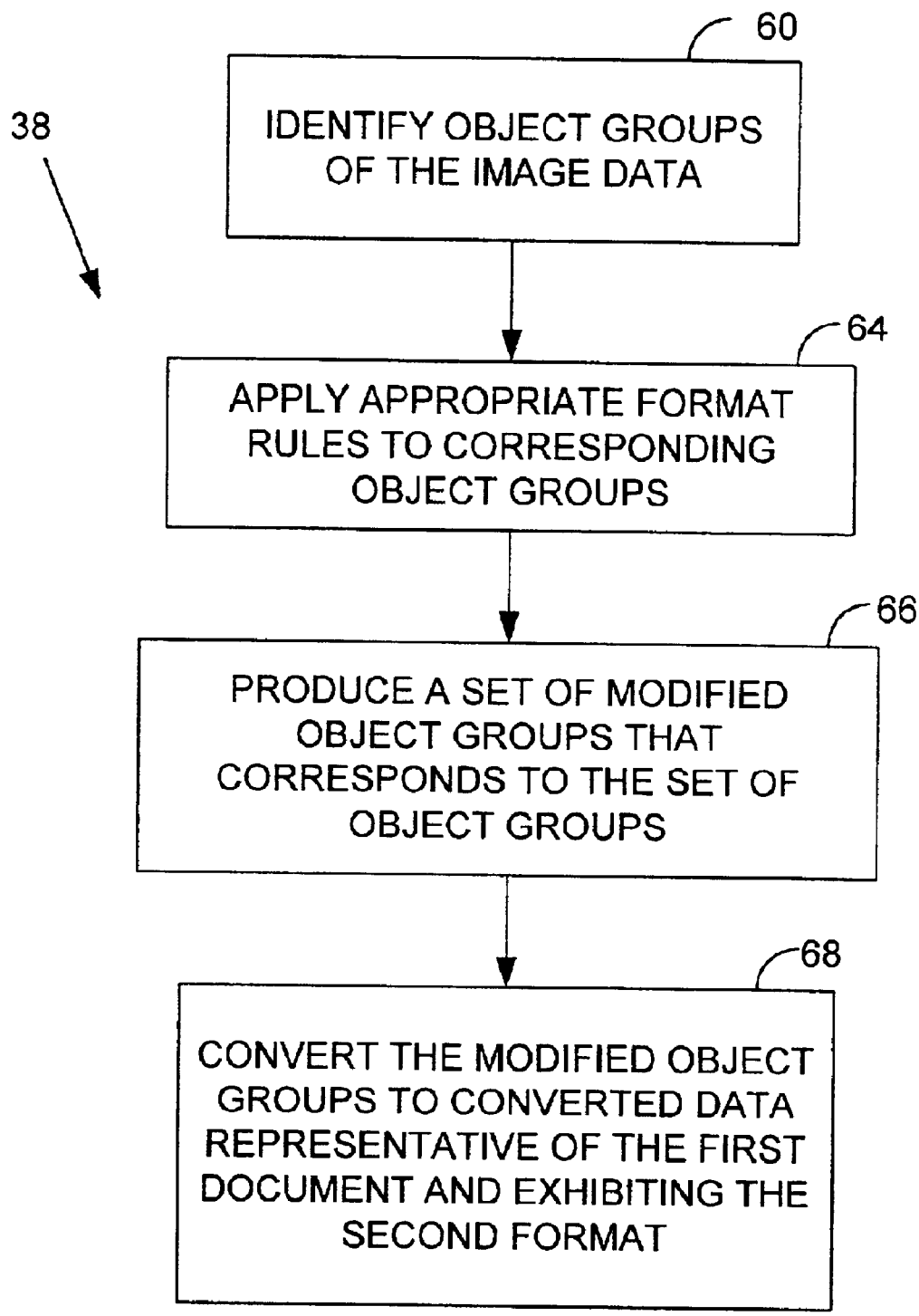
FIG. 5 is a flow diagram illustrating representative functionality of an embodiment of the converting system referred to in FIG. 2.

FIG. 5 is a flow diagram that illustrates representative functionality of an embodiment of the converting system 38, which is generally related to block 58 of FIG. 4. The converting system 38 is an exemplary system for performing the functions described in FIG. 5 and as such is capable of applying the appropriate set of format rules to the object groups, such as those produced by a conversion library. In this regard, the converting system 38 is adapted to identify one or more of the object groups produced by the conversion library, as shown in block 60. The converting system 38 can then apply specific format rules to specific object groups, as shown in block 64. As a result of applying the format rules, the file converting system 38 is capable of producing a set of modified object groups that can be used by the converting system 38 to produce converted data, as shown in blocks 66 and 68. As indicated above, such converted data is representative of the first document and exhibits the second format, which is different than the format of the first document.

Figure 6:
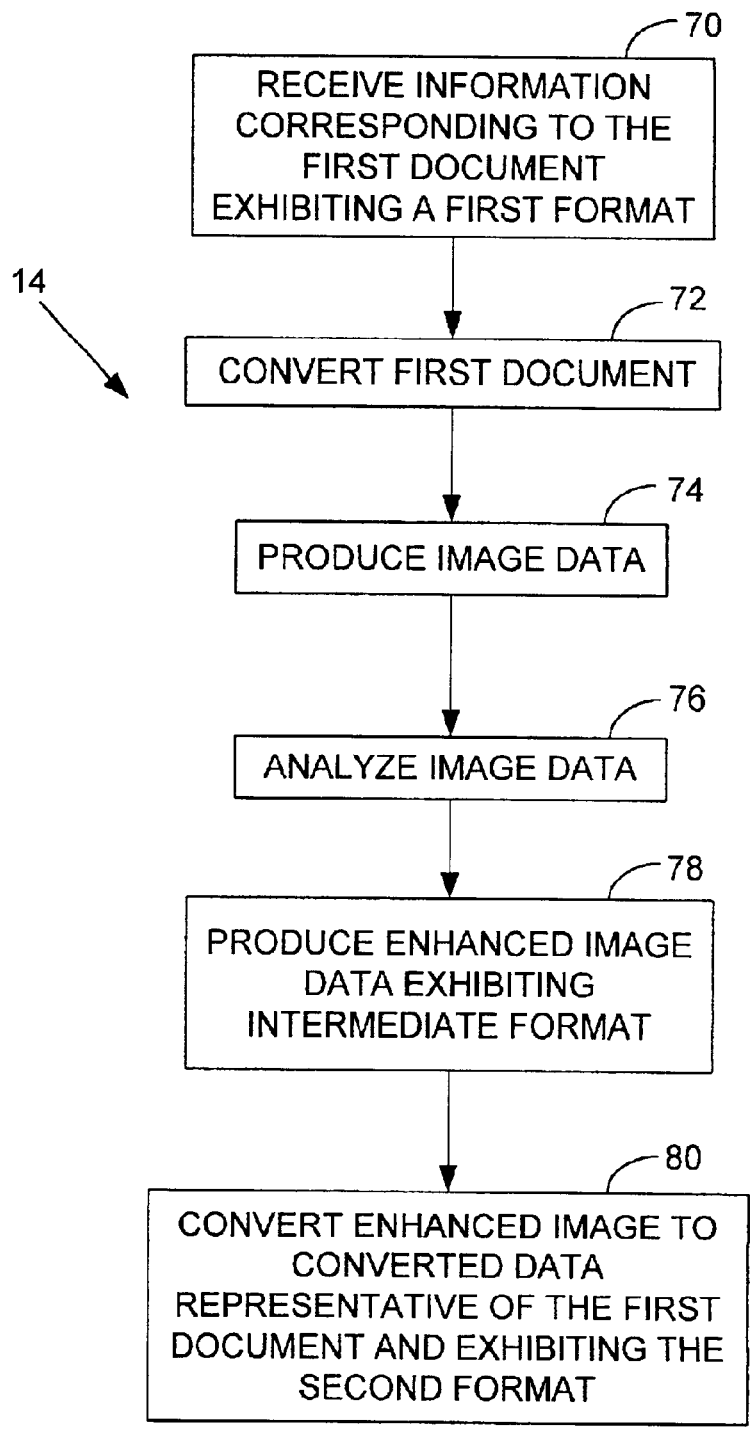
FIG. 6 is a flow diagram illustrating representative functionality of another embodiment of the document processing system referred to in FIGS. 1A and 1B.

FIG. 6 is a flow diagram that illustrates representative functionality of another embodiment of the format processing system 12, where the format processing system 12 includes an image analysis system 37 in addition to the converting system 38, as depicted in FIG. 2. The format processing system 12 is an exemplary system for performing the functions described in FIG. 6 and as such is adapted to receive information corresponding to a first document having a first format, as shown in block 70. The formats that the first format can exhibit include, for example, FPX, GIF, JPEG, TIFF, TIFF (compressed), TIFF (multipage), BMP, PCX, PNG, HTML, laserjet 1100 self viewer*.exe, PDF, RTF, TXT, WMF, etc. The format processing system 12 is capable of converting the information corresponding to the first document, as shown in block 72. The conversion can be performed using a conversion library. As discussed above, the conversion library is capable of converting the information corresponding to the first document into object groups, which can be exhibited as image data, such as, for example, an image data exhibiting a TIFF format. The conversion library is capable of producing image data exhibiting an intermediate format, as shown in block 74. Thereafter, the format processing system 12 is capable of analyzing the image data (block 76), where the analysis may be performed using an image analysis system 37, such as the one depicted in FIG. 7. The analysis of the image data using the image analysis system 37 produces enhanced image data, as shown in block 78. The format processing system 12 is adapted to convert the enhanced image data to converted data representative of the first document and exhibiting the second format, as shown in block 80. The second format includes formats, such as, for example, FPX, GIF, JPEG, TIFF, TIFF (compressed), TIFF (multipage), BMP, PCX, PNG, HTML, laserjet 1100 self viewer*.exe, PDF, RTF, TXT, WMF, etc.

Figure 7:
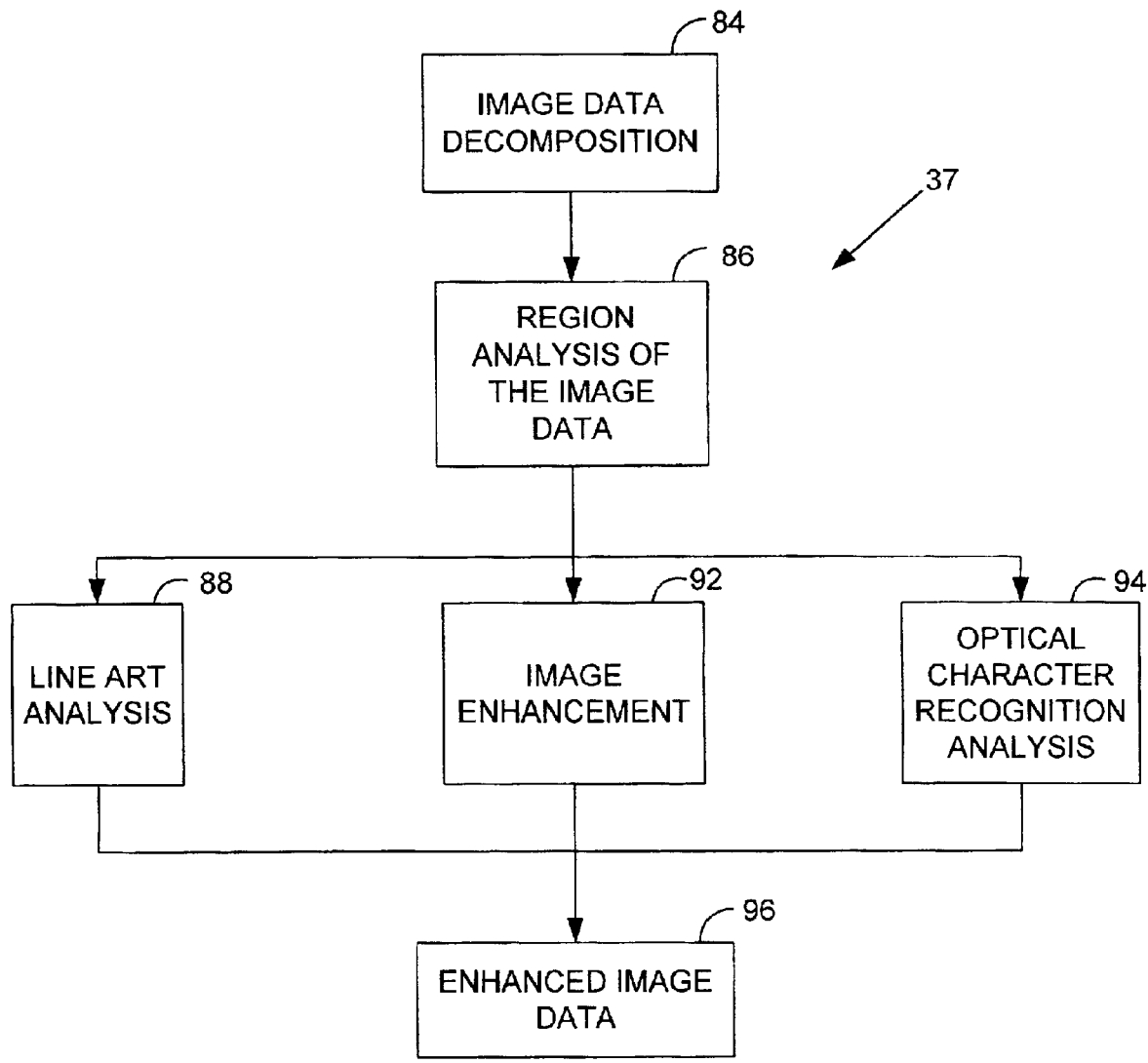
FIG. 7 is a flow diagram illustrating representative functionality of an embodiment of the analysis system referred to in FIG. 2.

FIG. 7 is a flow diagram that illustrates a representative image analysis system 37. Note, other image analysis systems are known in the art that can be used in conjunction with embodiments of the format conversion system 14. The image analysis system 37 is used for correcting problems associated with image data and/or enhancing features of the image data. For instance, the image analysis system 37 can enhance a photographic feature of the image data. The image analysis system 37 is an exemplary system for performing the functions described in FIG. 7 and as such is adapted to decompose the acquired image data, corresponding to the first document 16, into regions, in block 84. For example, text, image, digital independent bitmap, and line art can be decomposed into separate regions. The separate regions then can be analyzed (block 86) using separate analyses, as shown in blocks 88, 92, and 94. For example, the image analysis system 37 can separately analyze the image, and line art regions. More particularly, the image and line art regions can be enhanced using known techniques, and the text regions can be analyzed using well-known optical character recognition analysis processes. After analysis of the regions, the analyzed regions can be used to produce an enhanced image data, as shown in block 96.

As mentioned above, the format conversion system 14 of the present invention can be used to convert the image data into enhanced image data. The enhanced image data can be stored as a multivalent document file, which is essentially a file system within a file. Typically, such a structured file includes image(s) and text in a single, searchable document file. More specifically, a structured file includes object groups associated with features (e.g., text and/or image regions) of the image corresponding to the image data. As discussed previously, object groups can include groups such as, for example, text, line art, images, photographs, tables, etc. The structured file also can include other information, such as the coordinate location of associated object groups and a copy of a corresponding image data (before and/or after analysis). So configured, the structured file can be searched for specific information, such as a particular type of object group.

Figure 8:
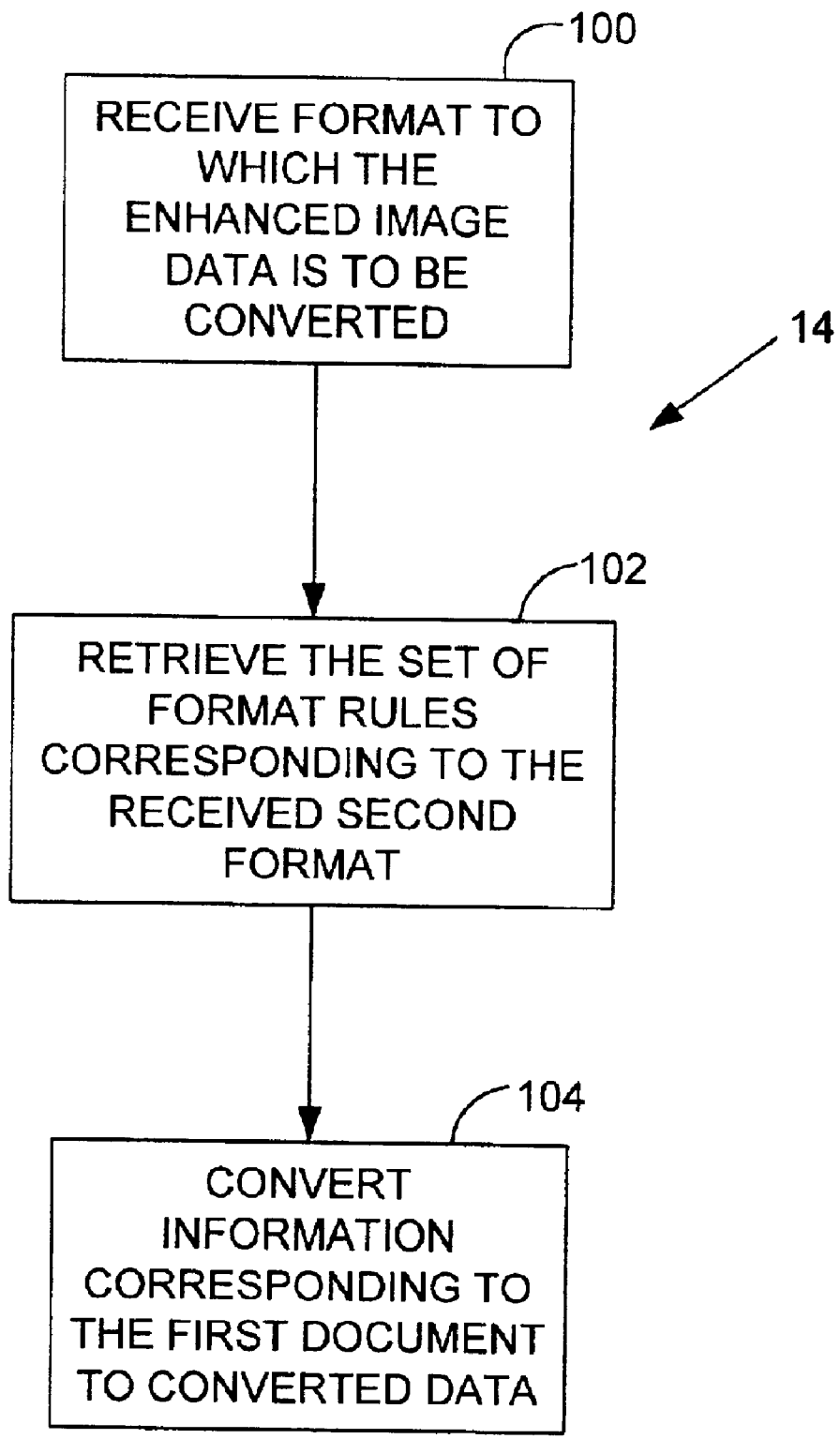
FIG. 8 is a flow diagram illustrating representative functionality of another embodiment of the file conversion system referred to in FIG. 2.

FIG. 8 is a flow diagram that illustrates representative functionality of an embodiment of the format conversion system 14, as shown in FIG. 2. The format conversion system 14 is an exemplary system for performing the functions described in FIG. 8 and as such is capable of receiving information corresponding to a second format to which to the enhanced image data is to be converted, as shown in block 100. For example, the second formats may include formats, such as, for example, FPX, GIF, JPEG, TIFF, TIFF (compressed), TIFF (multipage), BMP, PCX, PNG, HTML, laserjet 1100 self viewer*.exe, PDF, RTF, TXT, WMF, etc. Each second format has a corresponding set of format rules from which the format conversion system 14 can select and use to convert the object groups into modified object groups. Upon receiving information corresponding to the second format, the format conversion system 14 retrieves, such as from memory, the set of format rules that corresponds to the received second format, as shown in block 102. Thereafter, the enhanced image data is converted to converted data representative of the first document and exhibiting the second format, as shown in block 104.

Figure 9:
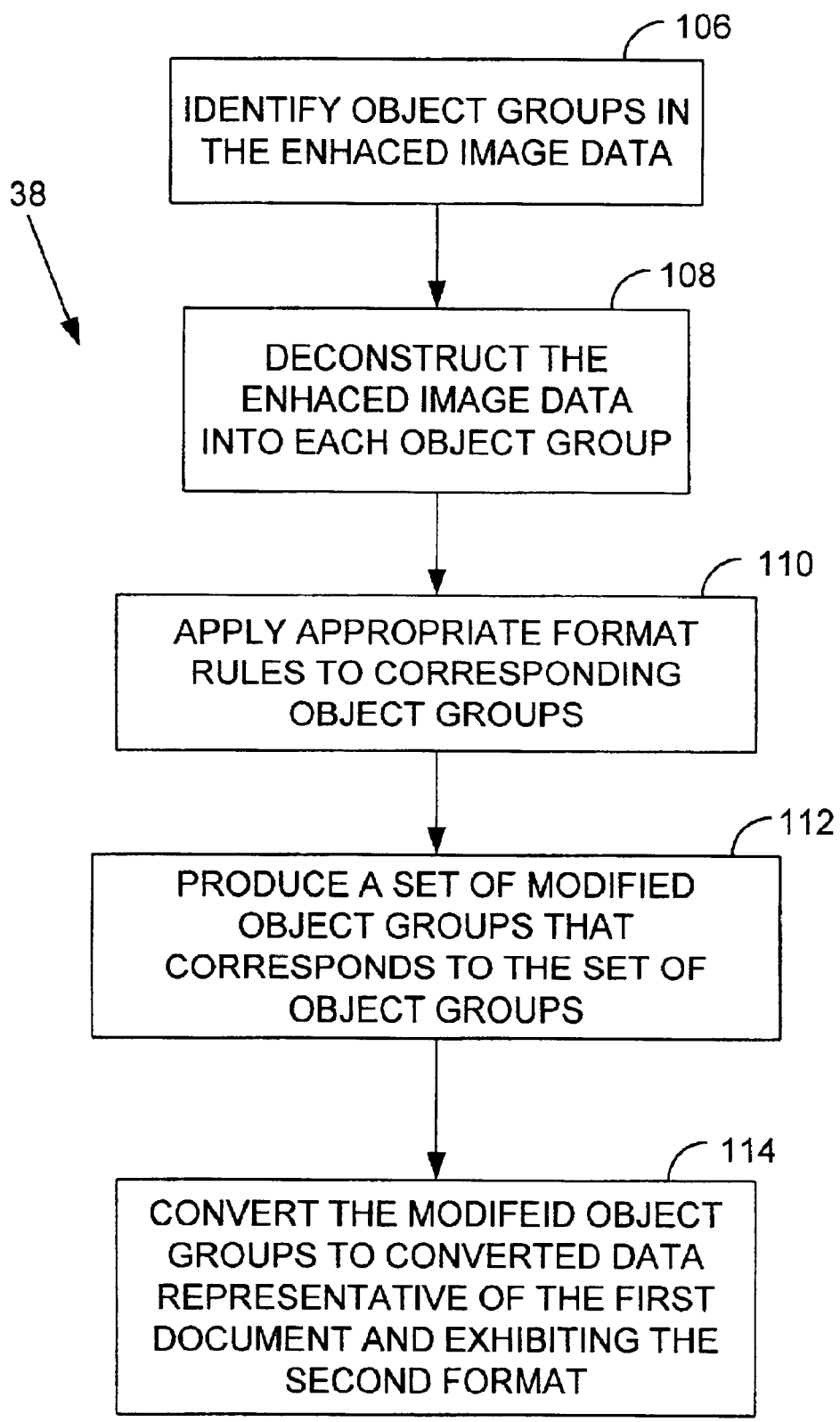
FIG. 9 is a flow diagram illustrating representative functionality of another embodiment of the converting system referred to in FIG. 2.

FIG. 9 is a flow diagram that illustrates representative functionality of an embodiment of the converting system 38, which is generally related to block 104 of FIG. 8. The converting system 38 is an exemplary system for performing the functions described in FIG. 9 and as such is capable of applying a particular set of format rules to the enhanced image data. In this regard, the file converting system 38 is capable of identifying one or more of the object groups included in the enhanced image data, as shown in block 106.

Based upon the identified object groups or other image information in the enhanced image data, the converting system 38 deconstructs the enhance image data, as shown in block 108. That is, the converting system 38 can search for and sequester specific information (e.g., object groups). For example, the file converting system 38 can search for and sequester text related object groups. Thus, the converting system 38 can apply specific format file rules to specific object groups of the enhanced image data, as shown in block 110. As a result of applying the format rules, the converting system 38 is capable of producing a set of modified object groups that can be used by the converting system 38 to produce the converted data, as shown in block 112. As indicated above, such converted data is representative of the first document and exhibits the second format, which is different than the format of the first document.

As the above discussion illustrates, embodiments of the format conversion system 14 facilitate the production of converted data representative of the first document and exhibiting the second format, where the converted data can have various formats that are different than the first format. As discussed above, this is advantageous because other converters are limited to the foreign formats to which it can receive and further limited to the number of foreign formats to which to convert the native format.

Many variations and modifications may be made to the above-described embodiment(s) of the invention without departing substantially from the spirit and principles of the invention.

For instance, it should be noted that a component of the format conversion system 14, such as the image analysis system 27, can be implemented by a separate computer. All such modifications and variations are intended to be included herein within the scope of this disclosure and the present invention and protected by the following claims.

What is claimed is:

1. A method for use in a computer system for converting the format of information corresponding to a first document, the first document exhibiting a first format, said method comprising:

receiving information corresponding to the first document;

receiving information corresponding to a second format to which the information corresponding to the first document is to be converted;

retrieving information corresponding to a set of format rules, the set of format rules corresponding to the second format;

converting the information corresponding to the first document to image data having at least one object group; and converting the image data according to the format rules to converted data representative of the first document and exhibiting the second format.

2. The method of claim 1, wherein the image data exhibits an intermediate format having at least one object group.

3. The method of claim 2, wherein the intermediate format comprises a TIFF format.

4. The method of claim 1, wherein converting the information corresponding to the first document, comprises:

providing a conversion library that is capable of converting information corresponding to the first document to image data;

analyzing the information corresponding to the first document with the conversion library; and converting the information corresponding to the first document to image data.

5. The method of claim 1, wherein converting the image data to converted data representative of the first document and exhibiting the second format, comprises:

analyzing the image data;

producing enhanced image data configured to have at least one object group; and converting the enhanced image data to converted data representative of the first document and exhibiting the second format.

6. The method of claim 5, wherein converting the enhanced image data to converted data representative of the first document and exhibiting the second format, comprises:

identifying each of the object groups in the enhanced image data; and applying the set of file format rules to the identified object groups of the enhanced image data.

7. The method of claim 6, further comprising:

producing a set of modified object groups that include a modified object group for each identified object group; and producing converted data representative of the first document and exhibiting the second format from the modified object groups.

8. The method of claim 5, wherein analyzing the image data, comprises:

converting the enhanced image data using an image analysis system, which is capable of altering the image data.

9. The method of claim 1, wherein converting the image data to converted data representative of the first document and exhibiting the second format, comprises:

identifying each of the object groups of the image data;

applying the set of format rules to the identified object groups;

producing a set of modified object groups that include a modified object group for each identified object group; and converting the modified object groups to converted data representative of the first document and exhibiting the second format.

10. The method of claim 1, wherein the first format includes TIFF, FPX, GIF, JPEG, BMP, PCX, PNG, HTML, PDF, RTF, TXT, HPD, and WMF.

11. The format processing system of claim 10, wherein the format conversion system includes a conversion library configured to converting information corresponding to the first document to image data and wherein the format conversion system is configured to analyze the information corresponding to the first document with a conversion library and convert the information corresponding to the first document to image data.

12. A format processing system for converting information corresponding to a first document, the information corresponding to the first document exhibiting a first format, the format processing system comprising:

a format conversion system configured to receive information corresponding to the first document; receive information corresponding to a second format to which the information corresponding to the first document is to be converted; retrieve information corresponding to a set of format rules, the set of format rules corresponding to the second format; convert the information corresponding to the first document to image data having at least one object group; and convert the image data according to the format rules to converted data representative of the first document and exhibiting the second format.

13. The format processing system of claim 12, wherein the format conversion system includes an image analysis system, configured to altering the image data.

14. The format processing system of claim 13, wherein the image analysis system is configured to analyze the image data and produce enhanced image data having at least one object group.

15. The format processing system of claim 12, wherein the format conversion system includes a converting system configured to converting the image data to converted data representative of the first document and exhibiting the second format.

16. The format processing system of claim 15, wherein the converting system is configured to identify each of the object groups of the image data, apply the set of format rules to the identified object groups, produce a set of modified object groups that include a modified object group for each identified object group, and convert the modified object groups to converted data representative of the first document and exhibiting the second format.

17. The format processing system of claim 15, wherein the converting system includes logic configured to identify each of the object groups of the image data; logic configured to apply the set of format rules to the identified object groups; logic configured to produce a set of modified object groups that include a modified object group for each identified object group; and logic configured to convert the modified object groups to converted data representative of the first document and exhibiting the second format.

18. The format processing system of claim 12, further including means for retrieving information corresponding to a set of format rules.

19. The format processing system of claim 12, wherein the image data exhibits an intermediate format having at least one object group.

20. The format processing system of claim 19, wherein the intermediate format comprises a TIFF format.

21. The format processing system of claim 12, wherein the first format includes TIFF, FPX, GIF, JPEG, BMP, PCX, PNG, HTML, PDF, RTF, TXT, HPD, and WMF.

22. A computer readable medium for use in a computer system for converting the format of information corresponding to a first document, the first document exhibiting a first format, said computer readable medium comprising:

logic configured to enable information corresponding to the first document to be received;

logic configured to enable information corresponding to a second format to which the information corresponding to the first document is to be converted to be received;

logic configured to enable information corresponding to a set of format rules to be retrieved, the set of format rules corresponding to the second format;

logic configured to enable the information corresponding to the first document to be converted to image data having at least one object group; and logic configured to enable the image data to be converted according to the format rules to converted data representative of the first document and exhibiting the second format.

23. The computer readable medium of claim 22, wherein the image data exhibits an intermediate format having at least one object group.

24. The computer readable medium of claim 23, wherein the intermediate format comprises a TIFF format.

25. The computer readable medium of claim 22, wherein the computer system has access to a conversion library that is capable of converting information corresponding to the first document to image data, and wherein the logic configured to enable the information corresponding to the first document to be converted, comprises:

logic configured to enable the information corresponding to the first document to be analyzed with the conversion library; and logic configured to enable the information corresponding to the first document to image data to be converted.

26. The computer readable medium of claim 22, wherein the logic configured to enable the image data to be converted according to the format rules to converted data representative of the first document and exhibiting the second format, comprises:

logic configured to enable the image data to be analyzed;

logic configured to enable enhanced image data configured to have at least one object group to be produced; and logic configured to enable the enhanced image data to be converted to converted data representative of the first document and exhibiting the second format.

27. The computer readable medium of claim 26, wherein the logic configured to enable the image data to be analyzed, comprises:

logic configured to enable the enhanced image data using an image analysis system to be converted, which is capable of altering the image data.

28. The computer readable medium of claim 26, wherein logic configured to enable the enhanced image data to be converted according to the format rules to converted data representative of the first document and exhibiting the second format, comprises:

logic configured to enable each of the object groups in the enhanced image data to be identified; and logic configured to enable the set of file format rules to be applied to the identified object groups of the enhanced image data.

29. The computer readable medium of claim 28, further comprising:

logic configured to enable a set of modified object groups that include a modified object group for each identified object group to be produced; and logic configured to enable converted data representative of the first document and exhibiting the second format from the modified object groups to be produced.

30. The computer readable medium of claim 22, wherein the logic configured to enable the image data to be converted according to the format rules to converted data representative of the first document and exhibiting the second format, comprises:

logic configured to enable each of the object groups of the image data to be identified;

logic configured to enable the set of format rules to be applied to the identified object groups;

logic configured to enable a set of modified object groups that include a modified object group for each identified object group to be produced; and logic configured to enable the modified object groups to be converted to converted data representative of the first document and exhibiting the second format.

31. The computer readable medium of claim 22, wherein the first format includes TIFF, FPX, GIF, JPEG, BMP, PCX, PNG, HTML, PDF, RTF, TXT, HPD, and WMF.

* * * * *